(12) United States Patent
El-Hage (10) Patent No.: US 11,195,199 B2
(45) Date of Patent: Dec. 7, 2021

(54) SYSTEM AND METHOD FOR ENHANCED COMMERCE

(71) Applicant: RAKUTEN USA, INC., San Mateo, CA (US)

(72) Inventor: Antoine El-Hage, Cambridge, MA (US)

(73) Assignee: RAKUTEN USA, INC., San Mateo, CA (US)

( * ) Notice: Subject to any disclaimer, the term of this patent is extended or adjusted under 35 U.S.C. 154(b) by 0 days.

(21) Appl. No.: 16/878,223

(22) Filed: May 19, 2020

(65) Prior Publication Data

US 2020/0279287 A1 Sep. 3, 2020

Related U.S. Application Data

(63) Continuation of application No. 13/738,860, filed on Jan. 10, 2013, now Pat. No. 10,748,170.

(51) Int. Cl.
*G06Q 30/00* (2012.01)
*G06Q 30/02* (2012.01)

(52) U.S. Cl.
CPC .............. *G06Q 30/0228* (2013.01)

(58) Field of Classification Search
CPC ................................ G06Q 30/0228
See application file for complete search history.

(56) References Cited

U.S. PATENT DOCUMENTS

| | | | |
|---|---|---|---|
| 6,129,274 A | 10/2000 | Suzuki | |
| 8,046,256 B2 | 10/2011 | Chien et al. | |
| 9,459,766 B1 * | 10/2016 | Haynes | H04L 43/08 |
| 2001/0054003 A1 * | 12/2001 | Chien | G06Q 20/10 |
| | | | 705/14.17 |
| 2002/0046116 A1 | 4/2002 | Hohle et al. | |
| 2004/0061720 A1 * | 4/2004 | Weber | G06F 16/957 |
| | | | 715/760 |
| 2009/0063261 A1 | 3/2009 | Scribner et al. | |
| 2009/0089176 A1 | 4/2009 | McCabe | |
| 2010/0036703 A1 * | 2/2010 | Chen | G06Q 30/0241 |
| | | | 705/14.4 |
| 2010/0257040 A1 | 10/2010 | Hunt | |
| 2012/0078737 A1 | 3/2012 | Kulakowski | |
| 2012/0101881 A1 | 4/2012 | Taylor et al. | |

(Continued)

FOREIGN PATENT DOCUMENTS

| | | |
|---|---|---|
| JP | H11-502647 A | 3/1999 |
| JP | 2000-040181 A | 2/2000 |
| WO | 1996/029668 A1 | 9/1996 |

OTHER PUBLICATIONS

Japanese Office Action dated Jan. 30, 2019 issued in corresponding Japanese Patent Application No. 2017-213592.

(Continued)

*Primary Examiner* — Alvin L Brown
(74) *Attorney, Agent, or Firm* — Troutman Pepper Hamilton Sanders LLP (57) ABSTRACT

A program controlled data-processing system and computer-based method for facilitating retail transactions based on a seamless translation of reward points into a suitable currency for purchase. In one embodiment, the present invention allows a user to utilize points without the traditional redemption restrictions or encumbrances associated with reward programs.

20 Claims, 7 Drawing Sheets

(56) References Cited

U.S. PATENT DOCUMENTS

| | | | |
|---|---|---|---|
| 2012/0316945 A1 | 12/2012 | Wolf et al. | |
| 2013/0268342 A1 | 10/2013 | Tune et al. | |
| 2014/0340332 A1 | 11/2014 | Lemay | |
| 2015/0058141 A1* | 2/2015 | Yablonka | G06Q 30/0241 |
| | | | 705/14.73 |
| 2016/0029069 A1 | 1/2016 | Bedi | |
| 2017/0228713 A1* | 8/2017 | Nichols | G07G 3/00 |

OTHER PUBLICATIONS

Rakuten Toolbar, Rakuten, Inc, Oct. 8, 2011, pp. 1-2, Internet <URL:https://web.archive.org/web/20120118010232/http://toolbar.rakuten.co.jp/intro/howto/>.

Japanese Office Action dated Sep. 14, 2016 issued in corresponding Japanese Patent Application No. 2015-552650.

International Search Report to PCT/US13/76386 dated Apr. 7, 2014.

Japanese Decision of Refusal dated Jul. 5, 2017 issued in corresponding Japanese Application No. 2015-552650.

\* cited by examiner

SYSTEM AND METHOD FOR ENHANCED COMMERCE

CROSS-REFERENCE TO RELATED PATENT APPLICATIONS

This application is a continuation of U.S. patent application Ser. No. 13/738,860, filed Jan. 10, 2013, the contents of which are herein fully incorporated by reference into this application.

The present invention relates to a computer platform for enhanced payment methods and an operative apparatus for implementation. In particular, the present invention relates to a purchasing support system that enhances the ability for consumer purchases including a module to provide payment flexibility in a seamless manner.

BACKGROUND

Retail shopping remains a billion-dollar business that involves a vast array of distinct distribution channels. Product purchases by consumers are made at traditional brick-and-mortar stores such as Macy's and on-line retailers such as Buy.com. While the shopping experience can be vastly different, there are common elements to the process. Goods are inspected, reviewed and selected for purchase. Prior to a customer's taking possession of a selected item, the purchase process must be completed, typically through the collection of payment for the selected item.

In a traditional store, the selected items are taken to a check-out, where a cash register is used to tabulate and collect the price of the goods, and to make change. To the extent that credit or debit cards are used for payment, the store includes network connections to various banks and related credit authorities to complete the requested transaction in near-instantaneous fashion. A substantial engineering effort has been made to make the final purchase process as seamless as possible, so as to complete the transaction in a minimal window of time.

A similar shopping experience has been created for web-based retailing. In particular, online merchants seek to replicate in part the experience shoppers have in a traditional retail environment, and further, to enhance the ability of consumers to browse goods so that the decision to purchase is enjoyable and the actual purchase and settlement is seamless and quick. To this end, various online tools such as "shopping carts" are used to simulate a traditional retail shopping experience, to collect goods for purchase and to complete the purchase at a separate checkout location (or checkout web page). Of course, online purchases are reliant on electronic commerce payment systems such as PayPal, and various credit/debit facilities, since cash or other currency types (e.g., checks) create additional issues for online transactions. In addition, online systems are subject to fraud and privacy concerns that don't typically concern traditional retail outlets. Moreover, there have been efforts to develop that facilitate the online purchase process, including local storage of redundant data. See, e.g., U.S. Publication No. 2010/0241518, herein incorporated by reference.

In addition to traditional and online shopping based on the above, there has been a growing use of reward points to effect select consumer behavior. Reward currencies stem from the earliest days of mass commerce, including the use of trading stamps more than 100 years ago to increase sales at gas stations and grocery stores (Sperry and Hutchinson at one point printed more "green" stamps than the US Postal System). Airlines and travel companies now routinely include some form of rewards currency, and many banks and credit cards have followed suit. As commerce has moved online, so have the various reward currency programs, with early versions distributed by "Netcentives" and similar outlets. The expanded use of reward currencies has increased geometrically the number of "points" held by consumers, swelling this purchasing currency so that it now reflects a meaningful potential driver of consumer sales.

These loyalty programs, however, limit consumers to redeeming their points at certain locations (and/or for certain items), such as the specific loyalty program's redemption store (or a limited collection of stores). Thus, if a loyalty program's redemption store does not carry an item the consumer wants, the consumer may be forced to spend her loyalty points on an item she does not want. Moreover, the customer may be dissatisfied enough to simply forgo using her points, as evidenced by the billions of dollars worth of points accumulated in the online marketplace that went unused and were allowed to expire in 2011. In addition, consumers do not currently have an effective means for utilizing their points offline, in a traditional store.

There are several emerging technologies that are now changing the landscape of traditional point of sale commerce. Over the last decade, there has been a growing adoption by merchants of "tap" to buy systems that allow a credit/debit card holder to skip the card swipe and complete the transaction with a simple tap. More recently, smartphones and tablets are now equipped with near field technologies that allow communications between the phone/tablet and various point of sale detector/computer systems. Examples of this new platform are many and diverse such as that found in US Publication No. 20120238207, herein incorporated by reference. This capability has greatly increased the sophistication of point of sale communication capabilities including tracking and the like. There, however, has not been a meaningful solution to simplify and facilitate reward/promotion based transactions.

There exists a need for an effective system of allowing points to be redeemed for any purchase, online and offline—including purchases outside of a specific loyalty redemption store.

DETAILED DESCRIPTION

The present invention provides a data-processing system and computer-based method that allow a user to effectively utilize her "loyalty points" to purchase goods or services in a seamless fashion. In particular, the present invention allows a user to utilize points without the traditional redemption restrictions or encumbrances associated with loyalty programs.

Figure 1:
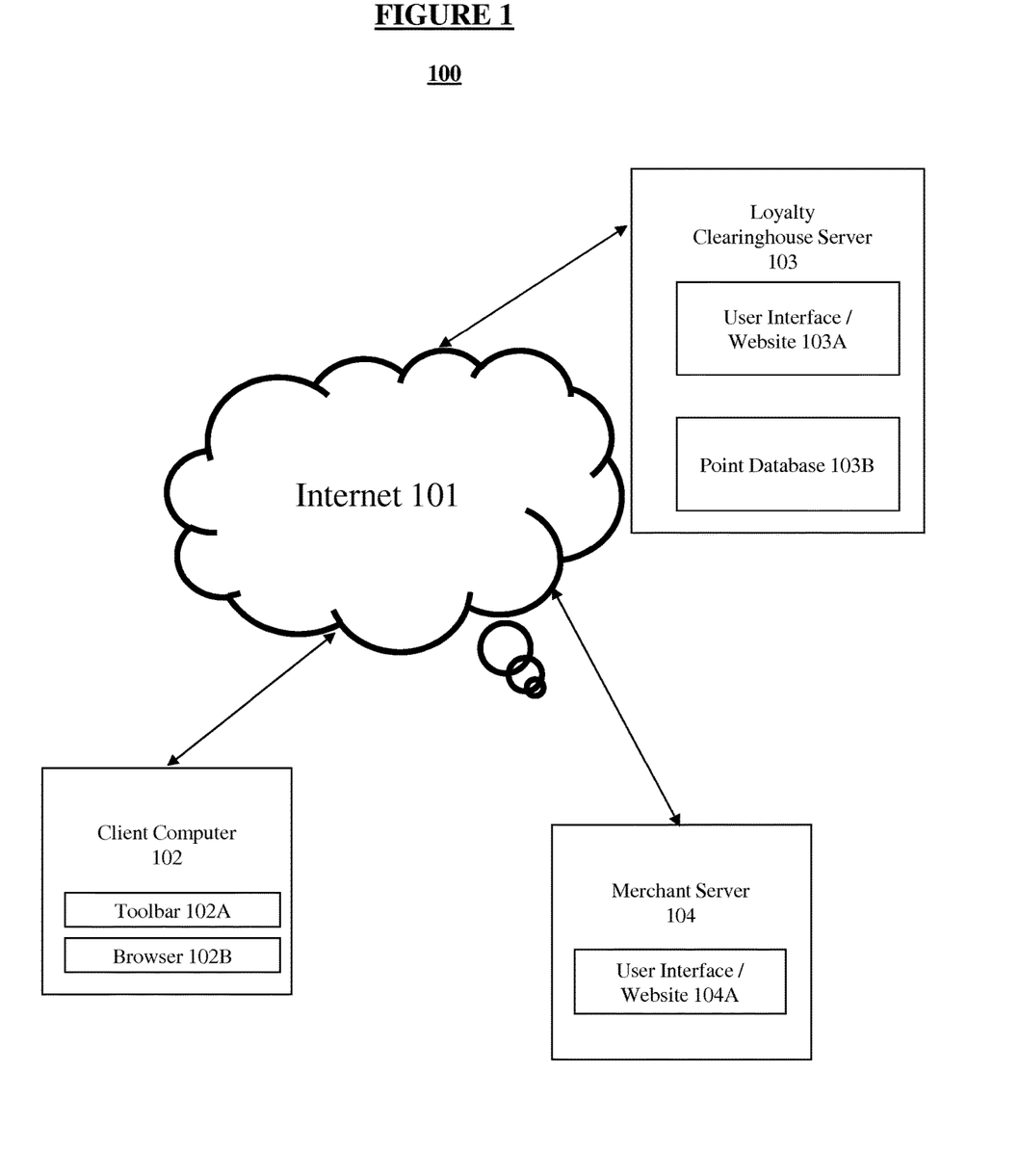
FIG. 1 illustrates the environment of the disclosed technology in accordance with certain embodiments.

FIG. 1 illustrates an embodiment of the presently disclosed system for utilizing points without traditional loyalty program restrictions. System 100 includes Client Computer 102, Loyalty Clearinghouse Server 103, and Merchant Server 104. Client Computer 102 may be any type of mobile device or computing device, described in further detail below, such as a smart phone or tablet. Client Computer 102 is operated by a user that is eligible to or has enrolled into one or more loyalty programs and is generating loyalty points (or "points"); for example, by shopping online or viewing online advertisements. Client Computer 102 contains Toolbar 102A and/or Browser 102B.

Browser 102B allows the user to access and view various web sites within a distributed network such as the internet. Toolbar 102A is program separate from the browser (but which may be integrated with the browser), that provides one or more reward and promotional related functions including point utilization, point generation/tracking, search functionality, advertisement display and/or branding. Specifically, in one embodiment, Toolbar 102A assists in utilizing, via Loyalty Clearinghouse Server 103, points from one or more loyalty programs with any merchant website, and transparently to the merchant. This process is described in greater detail below.

In one embodiment, Toolbar 102A or another toolbar may be used to track or generate points. To illustrate, when a toolbar is downloaded from a participating website, (eg., "blog.com"), that selectively configured toolbar will display advertisements as the user browses the internet, and, based on the advertisements displayed or selected, or other point-generating activities undertaken by the use in accordance with the operative features of the rewards program, the toolbar will assign/provide points to the user and transmit reward data to the Loyalty Clearinghouse Server 103, or to the respective loyalty program's server. As understood by those skilled in the art, points may be generated in many different ways, and the generation of points to be used by the present invention is not limited to the embodiments described herein.

Loyalty Clearinghouse Server 103, which may be operated by an entity associated with a loyalty program or a third party, includes a Website 103A and a Points Database 103B. Client Computer 102 may access Website 103A via Internet 101, and the user may enroll in the associated loyalty program (if available), associated loyalty clearinghouse program, and/or download Toolbar 102A. Client Computer 102 may also access and enroll in loyalty programs sponsored by other entities at their respective servers. In certain embodiments, Loyalty Clearinghouse Server 103 does not provide its own loyalty program. While Loyalty Clearinghouse Server 103 may be dedicated to a single loyalty program, in a preferred embodiment, it operates to support multiple programs as a clearinghouse for point utilization activity. Various loyalty programs may register with Loyalty Clearinghouse Server 103 so that, for example, their users are able to utilize their points outside of the respective loyalty program's limited and restrictive loyalty network.

Information relating to the user's accumulated points is stored in Points Database 103B. Additionally, information relating to conversion rates of various loyalty program points to a currency is stored in Points Database 103B. For example, loyalty program 1 sponsored by One Corp. and loyalty program 2 sponsored by Two Corp. are supported by Loyalty Clearinghouse Server 103 sponsored by Clearinghouse Corp. In this example, the Points Database 103B may store information indicating that 100 points from loyalty program 1 are worth $5, and 100 points from loyalty program 2 are worth $10.

Merchant Server 104, which may be operated by the merchant entity or a third party, includes a Website 104A that advertises/sells items (the term "items" shall mean products, services and/or anything that may be paid for online). Client Computer 102 may access Website 104A via Internet 101. After a user adds items to their online "shopping cart," the user enters the checkout process to pay for the items. Traditionally, a user will enter their credit card information at the checkout page. In one inventive embodiment, Toolbar 102A will prompt the user to pay for the purchase using the user's points. Optionally, Toolbar 102A will display the total amount of points the user has, and show how many of those points will be needed and/or used for the purchase. Toolbar may communicate with Points Database 103B to determine the number of points the user has, and the associated dollar (or other currency) value of those points.

If the user chooses to pay for the purchase with her points, the Loyalty Clearinghouse Server 103 will determine the number of points needed based on the purchase price (which may include shipping, tax, and other charges) and the point-currency conversion rate, deduct those points from the user's account in the Points Database 103B, generate a temporary credit card number that has a credit of the currency value of the deducted/redeemed points, and fill in the temporary credit card number in the order page (or present the number to the user to enter into the order page). The order will then proceed using the temporary credit card number. Accordingly, the present system may be made completely transparent to the Merchant Server 104; that is, the Merchant Server 104 cannot detect that the user is paying for the purchase with points. Additionally, the Merchant Server 104 need not include any special software/code, and need not be a participant in any loyalty program.

In one embodiment, the user may adjust the number of points to be used. In fact, optionally a user may use her points even if they will not cover the full cost of the purchase, or use less than all of her points for partial payment for the purchased item. In each of these arrangements, the user may pay for the remaining balance using traditional means, such as a credit/debit card. In a separate arrangement the Merchant Server 104 contains code to interact with the Loyalty Clearinghouse Server 103 to effect the purchase with loyalty points, without the use of Toolbar 102A.

Accordingly, this system encourages the use of points and is beneficial to customers, merchants, loyalty programs, and credit card companies. Specifically, the customers/users are able to redeem their points on items they actually want to purchase, and are not limited to restrictive loyalty programs. Merchants are able to generate more sales due to the increased use of points. Companies sponsoring loyalty programs that register with the Loyalty Clearinghouse are able to remove the value of points from their balance sheets, and encourage the usage of their loyalty programs through increased customer satisfaction. Finally, credit card companies, through issuance of temporary or one-time credit cards, are able to generate additional fees.

In certain embodiments, a mobile device may be used to scan a barcode within a retail store, and initiate the redemption of points for the purchase of that item (either within the physical store or at an online store) in accordance with the present invention. For example, a loyalty program customer is walking through a Macy's store and sees a jacket he likes.

The customer scans the barcode of the jacket with his phone, the loyalty clearinghouse application locates the product online—for example, at buy.com—and presents the user with the opportunity to use his points to pay for the jacket. Optionally, the application will show the customer the conversion rate of points to a particular currency in addition to the price of a selected item, and current points balance. The customer can then either choose to buy the coat at the traditional store—with points and/or cash/credit—and the benefit of easy return etc., offered by such retail outlets. Or the customer can visit the shopping portal and make the purchase online—again using points, credit/debit, or a combination of both at the specified conversion rate.

Figure 2:
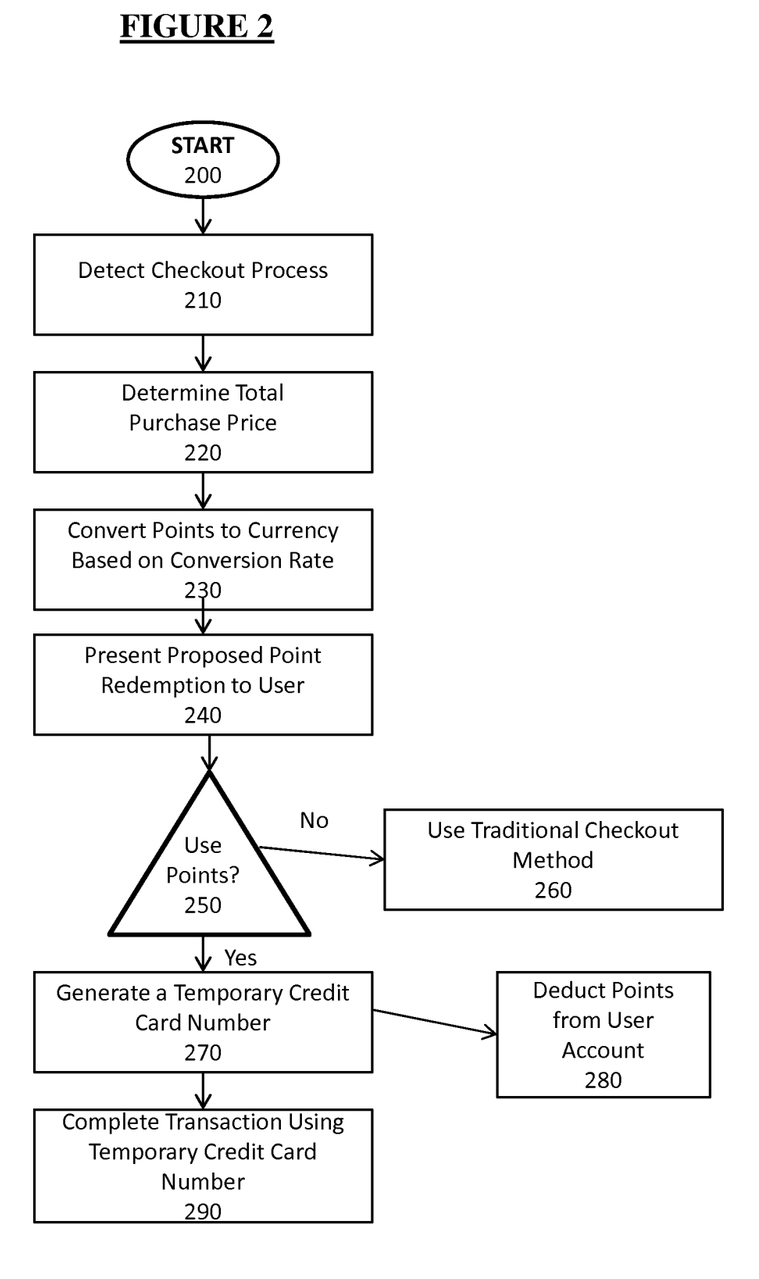
FIG. 2 illustrates the process flow of the disclosed technology in accordance with certain embodiments.

FIG. 2 is a flow chart of the process flow of the disclosed technology in accordance with certain embodiments. The process starts at 200 and proceeds to 210 where a toolbar determines if a user's browser is has initiated a checkout process or is at a checkout page. Once the toolbar has detected a checkout process, the method proceeds to 220 where the toolbar determines the total purchase price. At 230, the user's points are converted to the applicable currency (dollars, yen, etc.) based on a conversion rate. For example, the conversion rate may be specified by the loyalty program or the loyalty clearinghouse. The proposed point redemption, either up to the determined total purchase price or the user's total number of points, is presented to the user at 240. The user is then given the option to use the points for the purchase, 250. If the user selects no, the user is then able to check out through traditional means; for example, by using a regular credit/debit card. If the user selects yes, a temporary credit card number is generated, 270, and the associated points are deducted from the user's account, 280. The temporary credit card number is used to complete the checkout process, 290.

Figure 3:
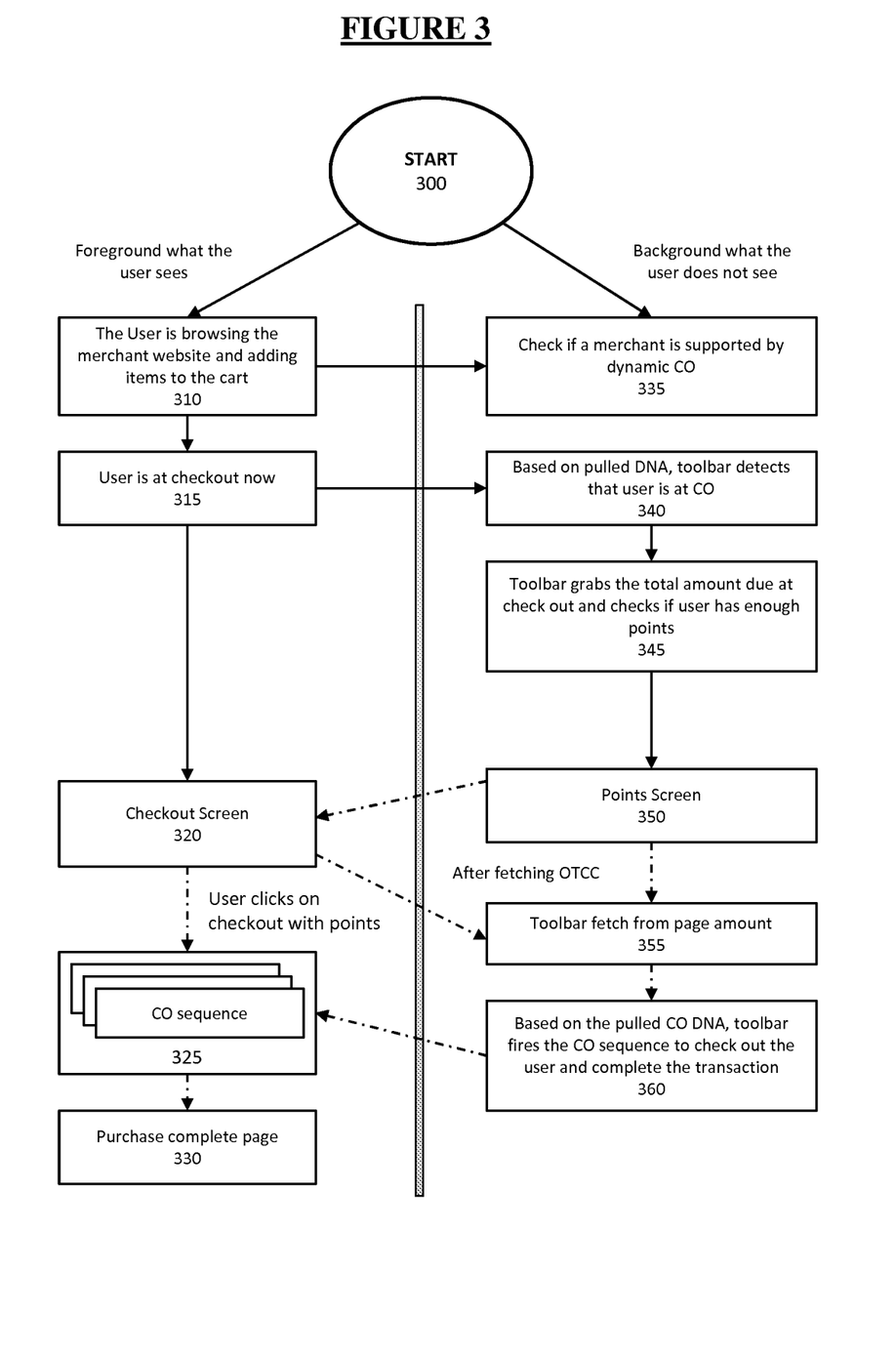
FIG. 3 illustrates the process flow of the disclosed technology in accordance with certain embodiments.

FIG. 3 is a flow chart of the process flow of the disclosed technology in accordance with certain embodiments. The process starts at 300 and proceeds to 310, where the user is browsing a Merchant website and adding items to her shopping cart. The left side of the chart reflects steps that are visible to the user, while the right side of the chart reflects steps that are not visible to the user. As the user is browsing the merchant site, the toolbar and/or browser determine if the merchant site supports the loyalty clearinghouse's dynamic checkout process. At 315, the user selects the checkout option at Merchant Website, and based on pulled "DNA", the toolbar detects that the user is at or entering checkout. "DNA" as used herein is the procedure and/or protocols used in a merchant website's checkout process. Each merchant website may have its own DNA. The loyalty clearinghouse utilizes the merchant website DNA in order to seamlessly map the dynamic checkout process. The toolbar obtains the amount due at check out and determines whether the user has enough points, 345. The toolbar will present the points screen at 350, which will show the user how many points are being used to pay for the purchase, and whether user has enough points to cover the full cost of the transaction.

As discussed above, in various embodiments, points may still be redeemed even where the points do not provide for the total purchase amount. At 320, the checkout screen is displayed to the user. When the user chooses to checkout using her points, a temporary credit card number or a one-time credit card (OTCC) will be generated, and the checkout sequence will continue at 325. At 355, the toolbar will fetch the page amount. Based on the pulled checkout DNA, the toolbar initiates the checkout sequence and completes the transaction using the temporary credit card number, 360. At 330, the Merchant's purchase completion page is displayed.

Figure 4:
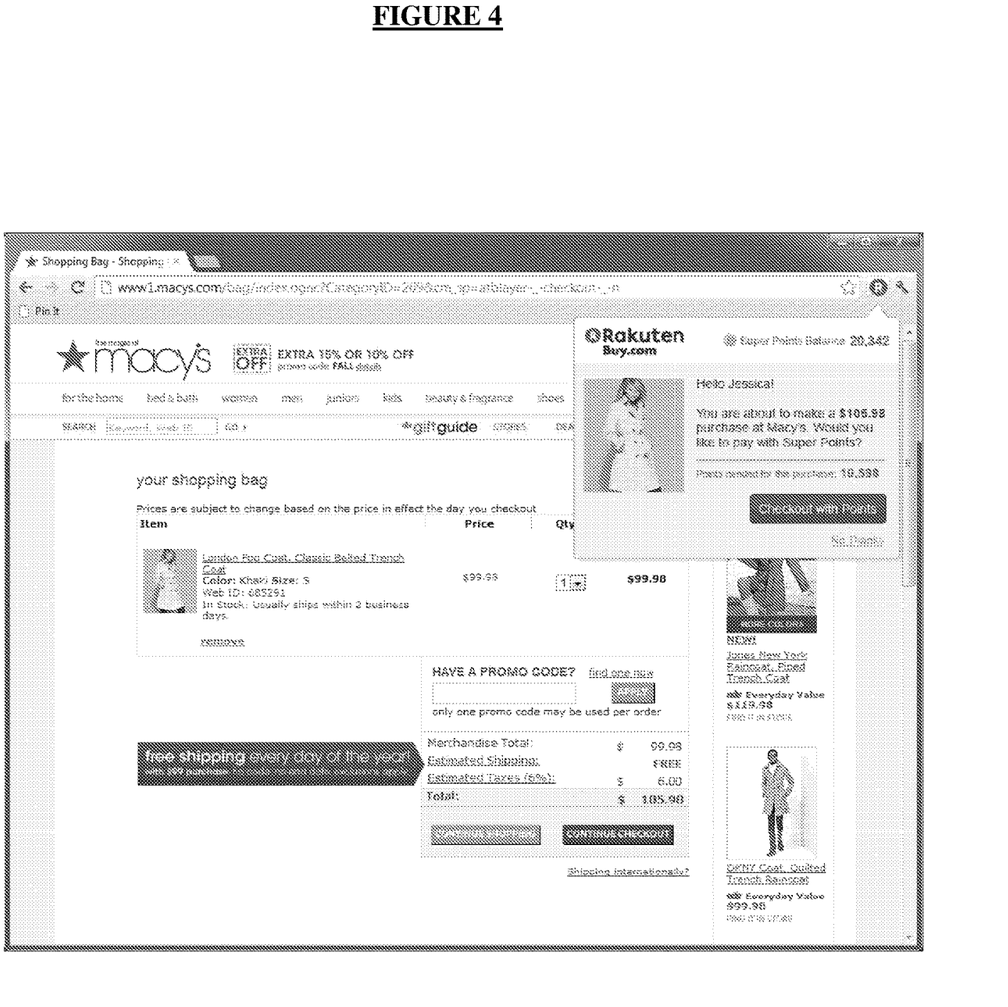
FIG. 4 is an illustrative screenshot of the present invention according to certain embodiments.

FIG. 4 is an illustrative screenshot of the present invention according to certain embodiments.

Figure 5:
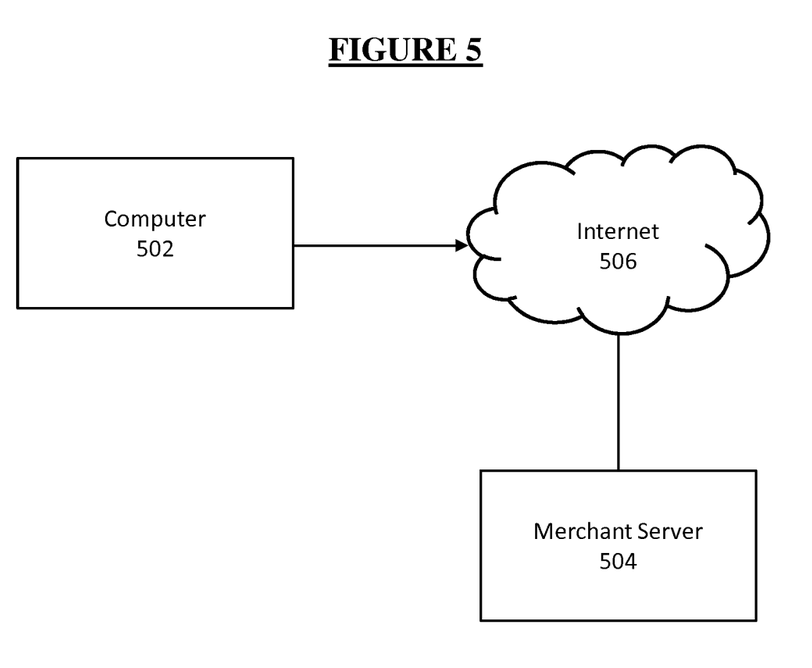
FIG. 5 illustrates the environment of the disclosed technology in accordance with certain embodiments.

FIG. 5 illustrates an arrangement of the present invention according to certain embodiments. Computer 502, operated by a web browsing customer, is able to connect to Merchant Server 504 via Internet 506. In this configuration, Computer 502 does not involve a toolbar for points based commerce. Instead, Merchant Server 504 has pre-registered to operate with the points based transactions in advance and thus includes code embedded on its website, such as JavaScript, that enables the site to recognize the visiting customer via "cookie" or similar associated with the Computer 502. This merchant based code operates transparent to the customer, except it provides the option to utilize customer points to pay for the purchase.

In particular, and in one example, the JavaScript enables the Merchant Server 504 to communicate with a credit card company server and/or a loyalty clearinghouse server for the points to credit conversion and payment information. For example, the JavaScript causes the Merchant Server 504 to contact the loyalty clearinghouse server to determine whether the user has enough points to complete the purchase and the conversion rate. Continuing with the example, upon selection by the customer, the loyalty clearinghouse server may then contact the credit card server to obtain a one-time credit card, deduct the corresponding points from the customer's points account, and send the one-time credit card number to the Merchant Server 504. Support may be provided for conversion from multiple reward programs and for use of one or more credit facilities, including the major card outlets—Visa and Mastercard—and those less known. Based on the platform used, optimized programs or combinations may be identified and/or ranked for selection by the customer during the check-out process. The Merchant Server 504 may then proceed with the checkout process as usual.

Example—Starbucks

Figure 6:
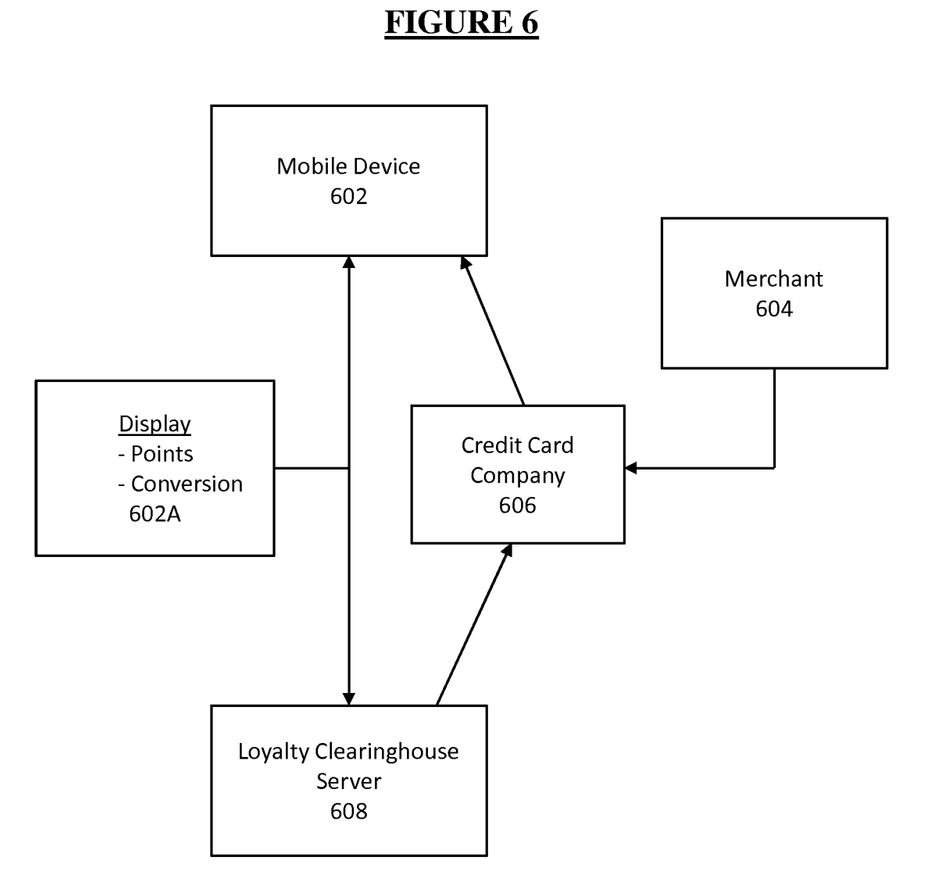
FIG. 6 illustrates an arrangement of the disclosed technology in accordance with certain embodiments.

FIG. 6 illustrates an example of the present invention in accordance with certain embodiments utilizing a mobile device in a retail store. In this example, the Mobile Device 602 used is a smartphone that is equipped with Near Field Communication (NFC) based on Radio-Frequency Identification (RFID) protocols. The smartphone is properly programmed, the customer has previously registered with Starbucks as a member, and is also registered with a loyalty clearinghouse that has contracted with Starbucks. Interested in a gourmet cup of coffee, the customer enters a Starbucks store 604, selects and receives her cup of coffee and moves to the check-out to pay for the purchase using points.

To do so, in a first arrangement, an application on the Mobile Device 602 is accessed, and communicates with Loyalty Clearinghouse Server 608 using the smartphone's data/cell communication link. Using the information accessed from the Loyalty Clearinghouse Server 608, the Mobile Device 602 may display the points available to the customer and/or the conversion value of the points to a currency (such as dollars). Additionally, the system can support interactive display of choices and prices/points for each purchase, and to the extent various reward currency/coupons are used, various restrictions will be checked. The Loyalty Clearinghouse Server 608 converts the customer's points, or a portion of the customer's total points, to a currency value, and sends a request to Credit Card Company 606 to issue a one-time credit card. The one-time credit card is sent from the Credit Card Company 606 to the Mobile Device 602 directly, or to the Loyalty Clearinghouse Server 608 first and then from the Loyalty Server 608 to the Mobile Device 602. The Merchant 604 communicates with the smartphone using the NFC enabled by both the phone and point of sale system; alternatively, the point of sale can scan the Mobile Device 602 (for example, using a bar code scanner to read the display of the Mobile Device 602), either before, after, or concurrently with the Mobile Device's contact with the Loyalty Clearinghouse Server 608. The Merchant 604 then charges the Credit Card Company 606 using one-time credit card, and the transaction is complete.

A second arrangement is also envisioned. For this arrangement, the smartphone includes programming that interacts directly with the POS system operated by Starbucks, sending a query about payment options upon checkout. Starbuck members often are provided incentives for various purchases based on volume or other promotions (seasonal such as the 12 days of Christmas); also members have accounts that require updating based on transactions. In this second arrangement, Starbucks server confirms that the customer is eligible for a rewards purchase—using points maintained by another program—in this case American Airlines. According to a pre-arranged exchange ratio, Starbucks converts the member's airline miles to currency, and then applies this currency directly to the purchase of the coffee product. A confirmation is sent back to the customer's smartphone which otherwise relies on the Starbucks system to complete the transaction. Under this scenario, there is no need for a onetime credit card number or charging facility.

Because of the interactive role that Starbucks and the various credit facilities play in the above transactions, system administration fees are appropriate, at each stage, measured in basis points against the transaction volume.

Certain credit cards, such as MasterCard's paypass, utilize contactless payment systems e.g., "tap". Contactless payment system include credit and debit cards or other devices that use RFID (or similar technology) for making payments. These contactless payment credit cards have an embedded chip that allows customers to wave their card over a reader at the merchant point-of-sale to effect payment. Use of Tap, or other NFC technologies discussed above provide outstanding fraud and privacy protections often unavailable from more traditional transaction systems, thus these systems tend to enjoy more support from the sponsoring credit facilities. In addition, these systems allow for the robust programming that can support the expanded use of reward currencies for conventional transactions and commerce.

Figure 7:
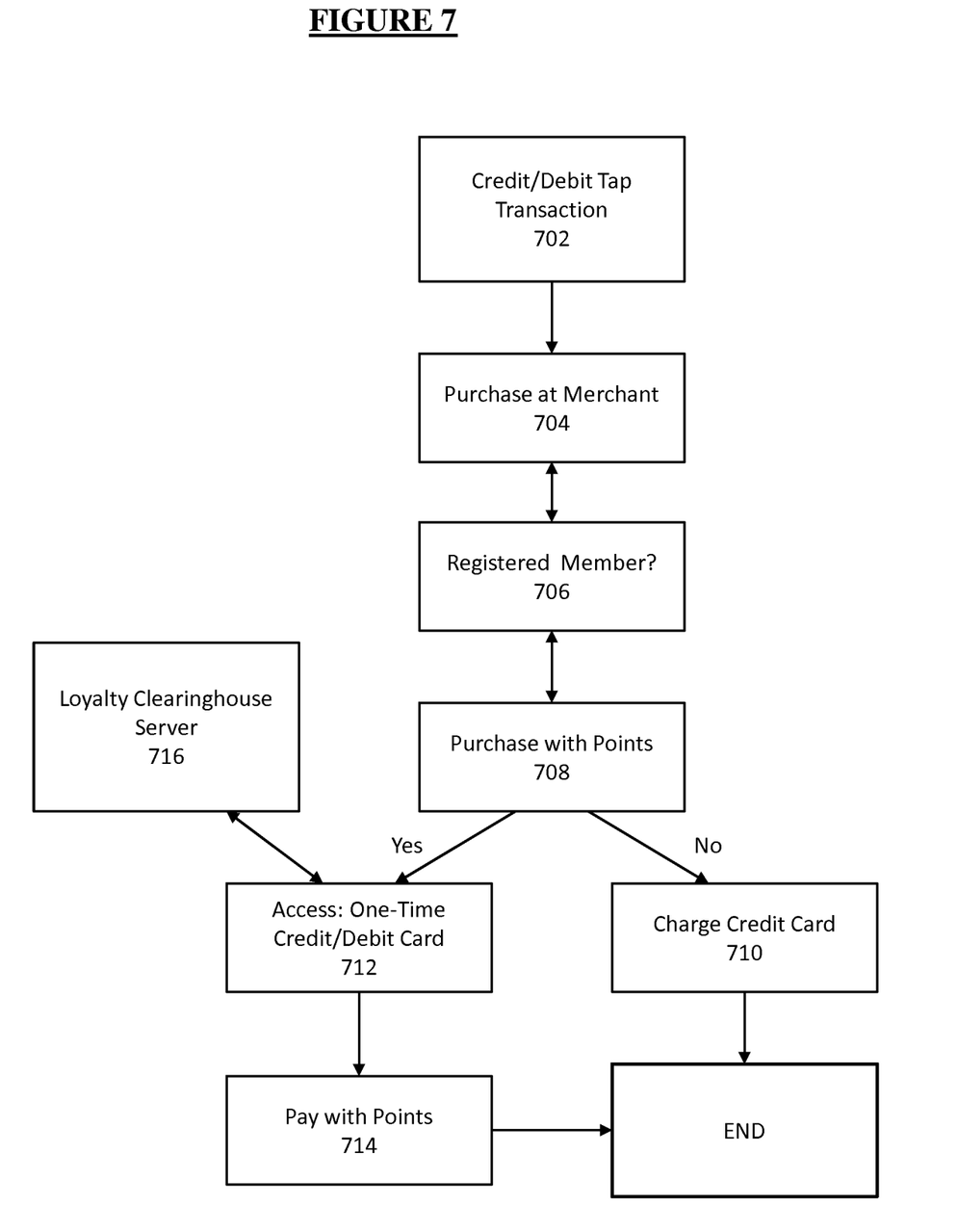
FIG. 7 illustrates an arrangement of the disclosed technology in accordance with certain embodiments.

FIG. 7 illustrates an arrangement of the invention utilizing contactless payment systems. At 702, a customer uses a "tap" credit card (a contactless payment system) to make a purchase at Merchant 704. Merchant 704 determines whether the customer is registered in its point redemption program. If the customer is registered, at 708 the customer has the option of using her points or paying through traditional means. In one example, the customer pays through her Credit Card at 710, and the transaction ends. In another example, the user chooses to use her points, the merchant contacts the credit card company to issue a one-time credit card at 712. The credit card company, in turn, contacts the Loyalty Clearinghouse Server at 716 to determine if the customer has enough points, and if so, deducts the points from the customer's account and issues a one-time credit card. At 714, the customer completes the transaction using the one-time credit card which was obtained in exchange for points, and the process ends. Optionally, the user may be presented with the points to currency conversion before accepting the redemption of her points.

Accordingly, the present invention is able to support both merchants without membership requirements, and those that do require purchasers to be members. Commissions can be charged from the loyalty clearinghouse to the merchant and the credit card company—each of which can be measured in basis points on the transaction.

The invention described above is operational with general purpose or special purpose computing system environments or configurations. Examples of well known computing systems, environments, and/or configurations that may be suitable for use with the invention include, but are not limited to: personal computers, server computers, hand-held or laptop devices, smart phones such as iPhones, tablet devices such as iPads, multiprocessor systems, microprocessor-based systems, set top boxes, programmable consumer electronics, network PCs, minicomputers, mainframe computers, distributed computing environments that include any of the above systems or devices, and the like.

Components of the inventive computer system may include, but are not limited to, a processing unit, a system memory, and a system bus that couples various system components including the system memory to the processing unit.

The computer system typically includes a variety of non-transitory computer-readable media. Computer-readable media can be any available media that can be accessed by the computer and includes both volatile and nonvolatile media, and removable and non-removable media. By way of example, and not limitation, computer-readable media may comprise computer storage media and communication media. Computer storage media may store information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The computer system may operate in a networked environment using logical connections to one or more remote computers. The remote computer may be a personal computer, a server, a router, a network PC, a peer device or other common network node, and typically includes many or all of the elements described above relative to the computer. The logical connections depicted in include one or more local area networks (LAN) and one or more wide area networks (WAN), but may also include other networks. Such networking environments are commonplace in offices, enterprise-wide computer networks, intranets and the Internet.

For ease of exposition, not every step or element of the present invention is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present invention. In addition, various steps and/or elements of the present invention may be stored in a non-transitory storage medium, and selectively executed by a processor.

The foregoing components of the present invention described as making up the various elements of the invention are intended to be illustrative and not restrictive. Many suitable components that would perform the same or similar functions as the components described are intended to be embraced within the scope of the invention. Such other components can include, for example, components developed after the development of the present invention.

The invention claimed is:

1. A computer-implemented method for performing a dynamic checkout process by a toolbar of a computing device of a user at a merchant's website, comprising:
   determining whether the merchant's website supports the dynamic checkout process, by the user interaction with the merchant's website, wherein the dynamic checkout process includes completing a checkout process through the toolbar;
   receiving an instruction to initiate the checkout process; and
   performing the dynamic checkout process, by the toolbar, when the merchant's website supports the dynamic checkout process, including:
      detecting, by the toolbar, the checkout process, based on identification information of the merchant's checkout process;
      determining, by the toolbar, a total purchase price in currency due at the merchant's checkout process;
      displaying, by the toolbar in its frame, a proposed point redemption for the user's acceptance to complete the checkout process, wherein the proposed point redemption indicates a number of loyalty points convertible to a currency value in exchange for at least a partial payment of the total purchase price, the user's loyalty points unbeknown to the merchant, where the merchant is not a participant in a loyalty program associated with the user's loyalty points; and
      completing the checkout process using the proposed point redemption when the user accepts the proposed point redemption.

2. The method of claim 1, further comprising:
   detecting, by the toolbar, point-generating activities performed by the user as the user browses web pages transmitted via the Internet.

3. The method of claim 2, further comprising:
   rewarding, by the toolbar, loyalty points to the user based on the user's point-generating activities.

4. The method of claim 1, wherein the toolbar is associated with a clickable icon displayed adjacent to an address bar of a browser of the user, wherein the toolbar is displayed immediately below the clickable icon.

5. The method of claim 1, wherein the toolbar is displayed above the merchant's website.

6. The method of claim 1, wherein the toolbar has a frame overlaying at least a part of the merchant's website.

7. The method of claim 1, wherein the toolbar is downloaded from a participating website, wherein the toolbar displays advertisements as the user browses the Internet.

8. The method of claim 1, further comprising:
   maintaining, by a memory on a loyalty clearinghouse server, a loyalty points account for the user to track loyalty points rewarded to the user, each loyalty point being associated with a loyalty program, the loyalty clearinghouse server in communication with the user's computing device via a distributed network, wherein the toolbar assists in utilizing, via the loyalty clearinghouse server, loyalty points from one or more loyalty programs with the merchant's website unbeknown to the merchant.

9. The method of claim 8, further comprising:
   updating, by a processor of the loyalty clearinghouse server, the loyalty points in the user's loyalty points account based on the user's point-generating activities as detected by the user's computing device.

10. The method of claim 1, further comprising:
    determining, by the toolbar, whether a first merchant's website supports the dynamic checkout process, when the user browses the first merchant's website;
    detecting, by the toolbar, that the user is currently visiting a checkout page on the first merchant's web site;
    detecting, by the toolbar, a checkout process when the user is currently visiting the checkout page on the first merchant's website, based on identification information of the first merchant's checkout process, after determining that the first merchant's website supports the dynamic checkout process;
    determining, by the toolbar, whether a second merchant's website supports the dynamic checkout process, when the user browses the second merchant's website;
    detecting, by the toolbar, a checkout process when the user visits the second merchant's website, based on identification information of the second merchant's checkout process, after determining that the second merchant's website supports the dynamic checkout process; and
    initiating a checkout sequence by the toolbar for each merchant's website.

11. The method of claim 10, wherein the checkout sequence includes:
    determining, by the toolbar, a total purchase price in currency due at each merchant's checkout process; and
    displaying, by the toolbar in its frame, a proposed point redemption for the user's acceptance to complete the checkout process, wherein the proposed point redemption indicates a number of loyalty points convertible to a currency value in exchange for at least a partial payment of the total purchase price.

12. The method of claim 1, further comprising:
    displaying, by the toolbar in its frame, below the proposed point redemption, a clickable button to checkout with the proposed point redemption, and a clickable link to checkout without the proposed point redemption.

13. The method of claim 12, further comprising:
    completing the checkout process without the proposed point redemption when the user clicks the clickable link.

14. The method of claim 12, further comprising:
    completing the checkout process using the proposed point redemption when the user clicks the clickable button.

15. The method of claim 14, wherein the checkout process includes:

sending, to a server of a credit card company, data representing the currency value resulted from the conversion;

sending, to the server of the credit card company, a request to issue a one-time credit card number with a balance of the currency value resulted from the conversion;

receiving, from the server of the credit card company, the one-time credit card number;

sending the one-time credit card number to the user's computing device to complete the checkout process.

16. The method of claim 1, wherein the frame displaying the proposed point redemption at least partially overlays the checkout page on the merchant's web site.

17. A program controlled system for performing a dynamic checkout process, by a toolbar of a computing device of a user, at a merchant's website, comprising:

a user computing device including:
   a browser to display to a user the merchant's website transmitted via the Internet; and
   a toolbar displayed in the browser, the toolbar configured to:
      determine whether the merchant's website supports the dynamic checkout process, by the user interacting with the merchant's website, wherein the dynamic checkout process includes completing a checkout process through the toolbar;
      receive an instruction to initiate the checkout process;
      perform the dynamic checkout process, when the merchant's website supports the dynamic checkout process, including:
         detect the checkout process, based on identification information of the merchant's checkout process;
         determine a total purchase price in currency due at the merchant's checkout process;
         display a proposed point redemption for the user's acceptance to complete the checkout process, wherein the proposed point redemption indicates a number of loyalty points in exchange for at least a partial payment of the total purchase price, the user's loyalty points unbeknown to the merchant, where the merchant is not a participant in a loyalty program associated with the user's loyalty points; and
         complete the checkout process using the proposed point redemption when the user accepts the proposed point redemption.

18. The system of claim 17, wherein the toolbar is configured to:
   determine whether a first merchant's website supports the dynamic checkout process, when the user browses the first merchant's website;
   detect that the user is currently visiting a checkout page on the first merchant's web site;
   detect a checkout process when the user is currently visiting the checkout page on the first merchant's website, based on identification information of the first merchant's checkout process, after determining that the first merchant's website supports the dynamic checkout process;
   determine whether a second merchant's website supports the dynamic checkout process, when the user browses the second merchant's website;
   detect a checkout process when the user visits the second merchant's website, based on identification information of the second merchant's checkout process, after determining that the second merchant's website supports the dynamic checkout process; and
   initiate a checkout sequence for each merchant's website.

19. The system of claim 18, wherein the checkout sequence includes:
   determining, by the toolbar, a total purchase price in currency due at each merchant's checkout process; and
   displaying, by the toolbar in its frame, a proposed point redemption for the user's acceptance to complete the checkout process, wherein the proposed point redemption indicates a number of loyalty points convertible to a currency value in exchange for at least a partial payment of the total purchase price.

20. The system of claim 17, wherein the toolbar is configured to display in its frame, below the proposed point redemption, a clickable button to checkout with the proposed point redemption, and a clickable link to checkout without the proposed point redemption, wherein the toolbar is configured to complete the checkout process using the proposed point redemption when the user clicks the clickable button.

* * * * *